United States Patent
Nichol (10) Patent No.: US 7,849,740 B2
(45) Date of Patent: Dec. 14, 2010

(54) IMPACT RESISTANT SPEED SENSING OBJECT

(75) Inventor: Greg Nichol, Guelph (CA)

(73) Assignee: Nix Tek Inc., Guelph (CA)

( * ) Notice: Subject to any disclaimer, the term of this patent is extended or adjusted under 35 U.S.C. 154(b) by 386 days.

(21) Appl. No.: 11/716,742

(22) Filed: Mar. 12, 2007

(65) Prior Publication Data

US 2008/0223133 A1    Sep. 18, 2008

(51) Int. Cl.
*G01P 1/02* (2006.01)
*F41J 5/00* (2006.01)
*A63B 67/00* (2006.01)

(52) U.S. Cl. .................... 73/493; 73/495; 273/374; 473/588

(58) Field of Classification Search ........... 73/488–495, 73/498–499, 431, 866.5; 273/371, 374, 339; 473/233, 453, 446, 588
See application file for complete search history.

(56) References Cited

U.S. PATENT DOCUMENTS

| | | | | |
|---|---|---|---|---|
| 4,745,564 A | * | 5/1988 | Tennes et al. ............... | 702/141 |
| 5,207,720 A | * | 5/1993 | Shepherd .................... | 473/446 |
| 5,761,096 A | * | 6/1998 | Zakutin ....................... | 702/149 |
| 5,946,643 A | | 8/1999 | Zakutin | |
| 5,988,646 A | * | 11/1999 | Fair ............................ | 273/371 |
| 6,073,086 A | | 6/2000 | Marinelli | |
| 6,148,271 A | | 11/2000 | Marinelli | |
| 6,151,563 A | | 11/2000 | Marinelli | |
| 6,157,898 A | | 12/2000 | Marinelli | |
| 6,898,971 B2 | * | 5/2005 | Dilz, Jr. ....................... | 73/488 |
| 7,140,248 B1 | * | 11/2006 | Brundage ..................... | 73/492 |
| 2002/0007676 A1 | * | 1/2002 | Ward et al. ................... | 73/493 |

FOREIGN PATENT DOCUMENTS

CA    2402897    *    3/2004

* cited by examiner

*Primary Examiner*—Helen C. Kwok
(74) *Attorney, Agent, or Firm*—Pillsbury Winthrop Shaw Pittman LLP (57) ABSTRACT

An impact resistant speed sensing object having an inner body with a processor and at least one speed detecting sensors adapted to engage the inner body and adapted to interact with the processor for determining the speed of the impact resistant speed sensing object. The impact resistant speed sensing object further includes an impact resistant housing having apertures adapted to receive the inner body and the speed detecting sensor. The impact resistant speed sensing object has an aperture adapted to receive the impact resistant housing with the inner body and speed detecting sensor.

32 Claims, 9 Drawing Sheets

IMPACT RESISTANT SPEED SENSING OBJECT

FIELD OF THE INVENTION

This invention relates in general to a device that can determine its own speed and more particularly to a speed sensing object that can withstand high impact.

BACKGROUND OF THE INVENTION

The ability to sense and accurately determine the speed of an object can be critical especially in a sports environment. Depending on the sport, different types of measuring devices are available. Traditionally the device determining the speed of the object or other parameters, such as accuracy, is separate from the object itself. For example radar guns are often used to determine the speed of a baseball or hockey puck. These types of devices however are expensive and require additional people to operate. Typically these types of devices are not available to the average consumer or for amateur sports and are relegated to the professional. Furthermore the majority of these devices only offer a single function or mode.

Prior art speed determining devices have been devised to address some of the noted problems. For example, U.S. Pat. No. 5,761,096 issued on Jun. 2, 1998 and U.S. Pat. No. 5,946,643 which issued on Aug. 31, 1999 to David Zakutin relate to a speed-sensing projectile such as for example a baseball includes a generally spherical body. An inertial switch is positioned within the body and is actuable between open and closed conditions in response to accelerations of the body greater than a threshold value. A processor also within the body is responsive to the inertial switch and calculates the average speed at which the baseball is thrown over a fixed distance. A visible display on the body is in communication with the processor and displays the calculated speed.

U.S. Pat. No. 6,073,086 which issued on Jun. 6, 2000 to Dave Marinelli relates to a device for measuring the time of flight, speed, and trajectory height of a projectile, such as a baseball, football, hockey puck, or model rocket, or the time and speed of swing of a movable object, such as a baseball bat or golf club. Part of the device, called the object unit, is embedded, secured, or attached to the projectile or movable object of interest, and consists of an acceleration sensor, threshold circuit, and a radio transmitter. The other part of the device, called the monitor unit, is held or worn by the user and serves as the user interface for the device. The monitor unit has a radio receiver, a processor, an input keypad, and a display that shows the various measured motion characteristics of the projectile or movable object, such as distance, time of flight, speed, and trajectory height, and allows the user to input data to the device.

U.S. Pat. No. 6,151,563 which issued on Nov. 21, 2000, U.S. Pat. No. 6,148,271 which issued on Nov. 14, 2000 and U.S. Pat. No. 6,157,898 which issued on Dec. 5, 2000 to David Marinelli all relate to a device for measuring a movable object, such as a baseball, football, hockey puck, soccer ball, tennis ball, bowling ball, or a golf ball. Part of the device, called the object unit, is embedded, secured, or attached to the movable object of interest, and has a spin detection circuit, electronic processor circuit, magnetic field sensor circuit, and a radio transmitter. The other part of the device, called the monitor unit, is held or worn by the user and serves as the user interface for the device. The monitor unit has a radio receiver, a processor, an input keypad, and an output display that shows the various measured motion characteristics of the movable object, such as the time of flight, speed, trajectory height, spin rate, or curve of the movable object, and allows the user to input data to the device.

Prior art devices however are not suited to certain sports where the object is subject to extreme impact, for example where the object is a hockey puck. Thus a speed sensing object that can withstand high impact and other extreme conditions while remaining operable and has a variety of modes is desirable.

SUMMARY OF THE INVENTION

An object of one aspect of the present invention is to provide an improved impact resistant speed sensing object.

In accordance with one aspect of the present invention there is provided an impact resistant speed sensing object having an inner body with a processor and at least one speed detecting sensor adapted to engage the inner body and adapted to interact with the processor for determining the speed of the impact resistant speed sensing object. The impact resistant speed sensing object further includes an impact resistant housing having apertures adapted to receive the inner body and the speed detecting sensor. The impact resistant speed sensing object has an aperture adapted to receive the impact resistant housing with the inner body and speed detecting sensor.

Conveniently, the inner body further comprises a display system for engagement with the processor and a battery that is in constant engagement with a series of tabs mounted to the inner body for continuous power.

Preferably, a transparent protection housing adapted to encase a majority of the inner body is then inserted into the impact resistant housing. The impact resistant housing may include a first portion having a first aperture that can receive the inner body, and an additional two apertures which can each receive the speed detecting sensors. A second portion completes the impact resistant housing and engages the first portion as a bottom plate to provide a vapour free and temperature resistant impact resistant housing.

Conveniently the impact resistant speed sensing object has a slap mode, a snap mode and a pass mode. The speed of the impact resistant speed sensing object for the slap mode may be determined by a first speed detecting sensor, and the speed of the impact resistant speed sensing object for the snap and pass modes may be determined by a second speed detecting sensor.

Advantages of the present invention are the ability to detect the speed of an object such as a hockey puck, in a high impact environment; an impact or shock resistant encased inner housing; vapour proof and temperature insensitive inner housing allowing for consistent reading of the display system, improved design for continuous battery contact during impact; multiple speed detecting sensors to accommodate at least three modes or functions, namely slap, snap and pass; and appropriate for all levels of play from amateur to professional.

BRIEF DESCRIPTION OF THE DRAWINGS

A detailed description of the preferred embodiment is provided herein below by way of example only and with reference to the following drawings, in which.

In the drawings, preferred embodiments of the invention are illustrated by way of example only. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Figure 1:
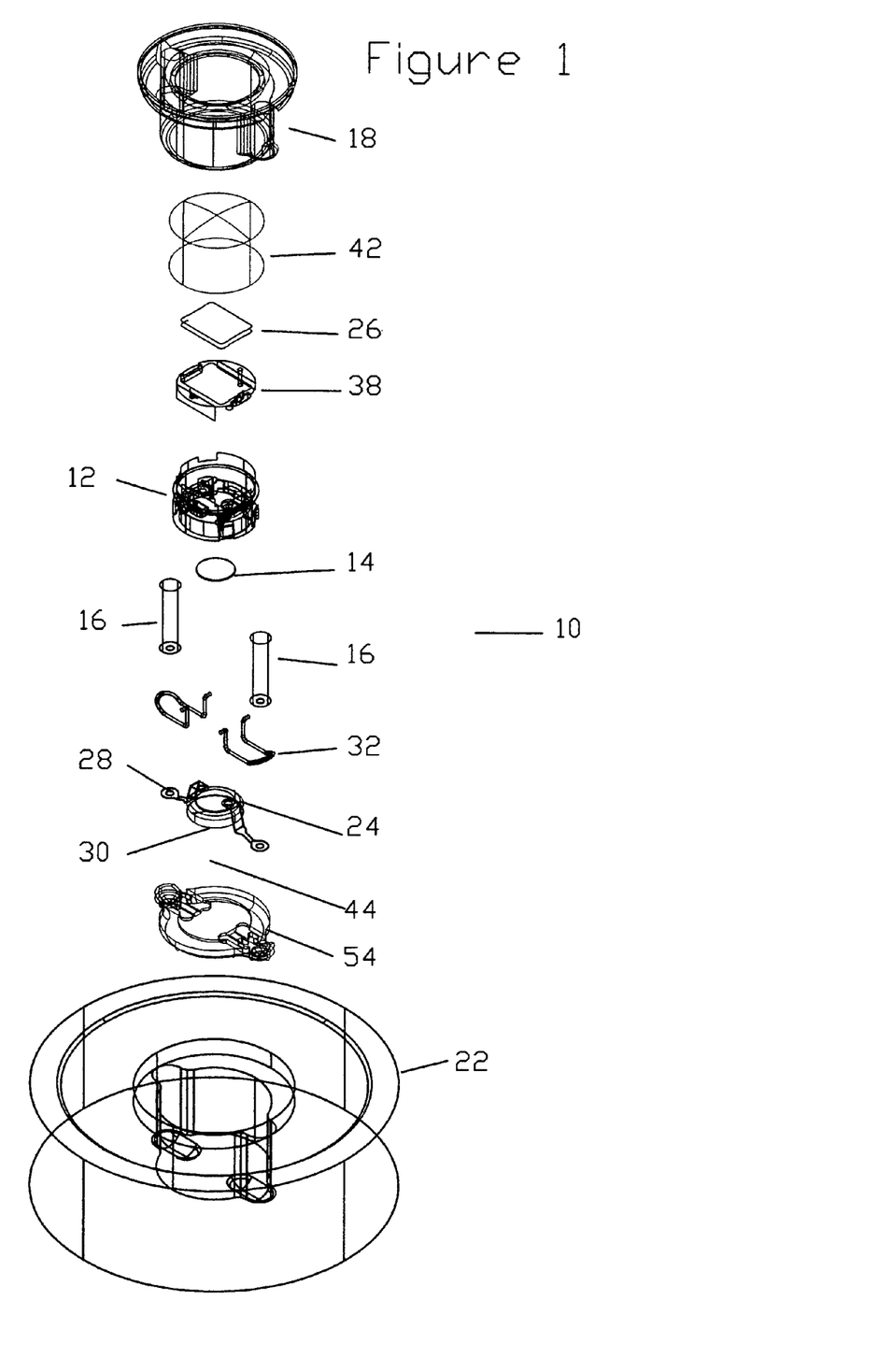
FIG. 1 in an exploded view, illustrates an impact resistant speed sensing object in accordance with a preferred embodiment of the present invention.
Figure 2:
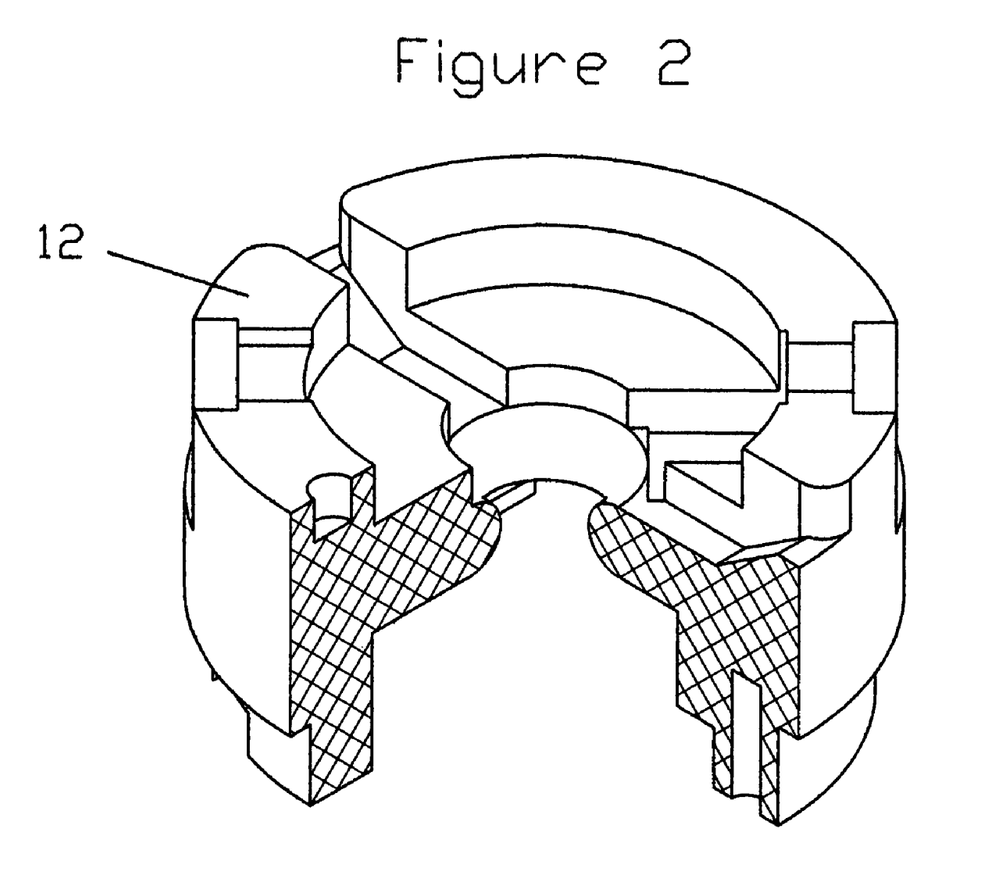
FIG. 2 in a cut-away perspective view, illustrates the inner body of the impact resistant speed sensing object of FIG. 1.

Referring to FIGS. 1 and 2, there is illustrated in an exploded view, an impact resistant speed sensing object 10 in accordance with the preferred embodiment of the present invention. The impact resistant speed sensing object 10 includes an inner body 12 with a processor 14 and at least one speed detecting sensor 16 adapted to engage the inner body 12 and adapted to interact with the processor 14 for determining the speed of the impact resistant speed sensing object 10. The impact resistant speed sensing object 10 further includes an impact resistant housing 18 having apertures 20 adapted to receive the inner body 12 and the speed detecting sensor 16. The impact resistant speed sensing object 10 itself has an aperture 22 adapted to receive the impact resistant housing 18 with the inner body 12 and speed detecting sensor 16.

Figure 3:
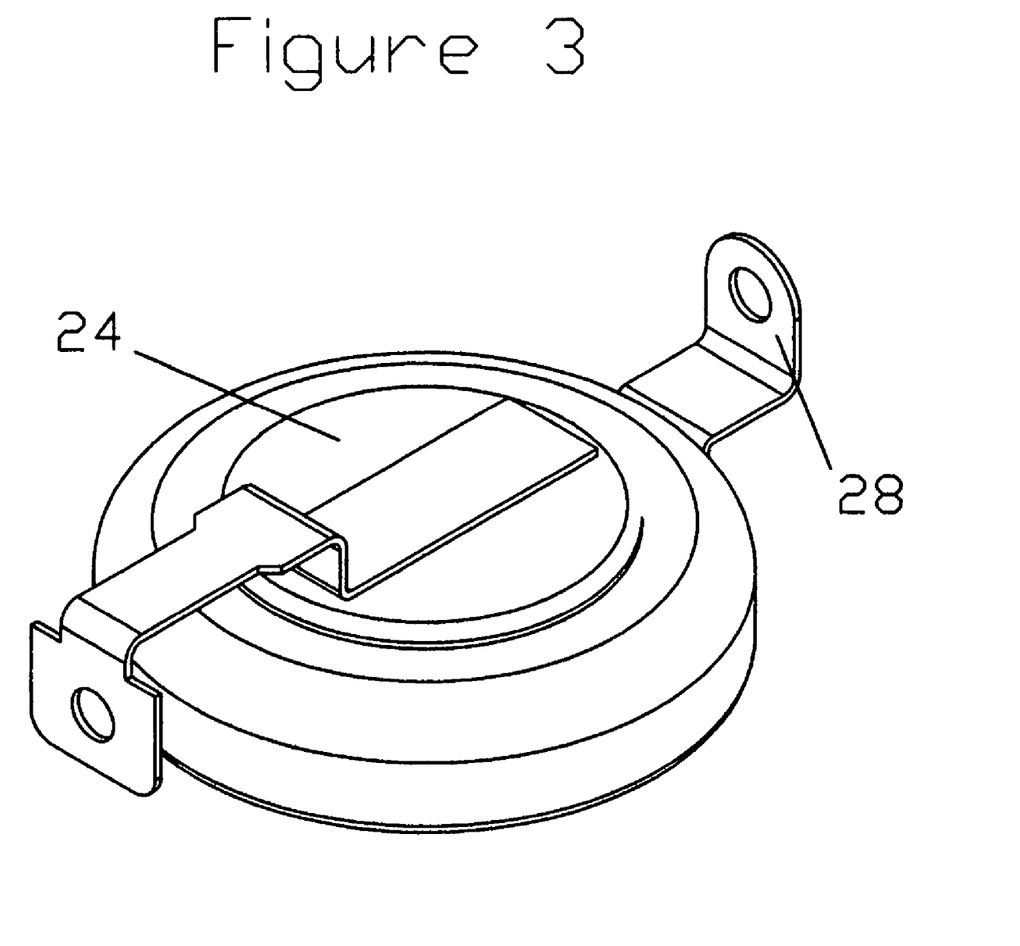
FIG. 3 in a perspective view, illustrates the battery and battery tab mounted together.

Referring to FIG. 3 the inner body 12 further comprises a battery 24 and a display system 26 for engagement with the processor 14. More specifically the battery 24 is in constant engagement with a series of tabs 28 mounted to the battery 24 for continuous power to the processor 14. The tabs 28 are laser welded to the battery 24 and then soldered to the inner body 12 to ensure that there is power to the processor 14 even during impact. Furthermore the battery 24 may be a silver oxide battery that once inserted into the inner body 12 partially forms a bottom surface 30 of the inner body 12. The display system 26 may be further defined as an LCD screen that is connected to the processor 14 or programmed microchip.

Figure 5:
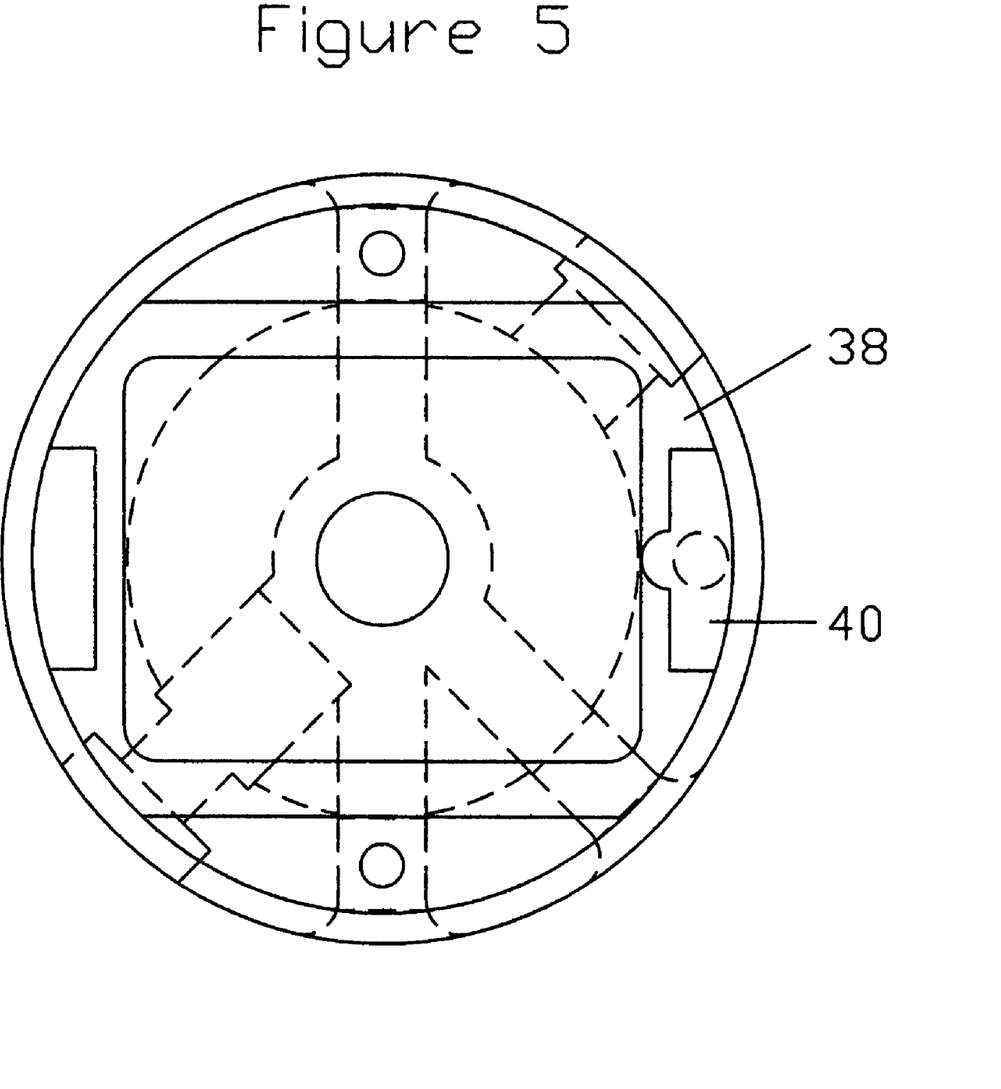
FIG. 5 in a top plan view, illustrates a top plate for mounting to the inner body of the impact resistant speed sensing object of FIG. 1.

Referring to FIG. 5 the inner body 12 further includes a top plate 38 that is adapted to engage the display system 26 and form a top surface 40 of the inner body 12. The top plate 38 is adhered to the display system with a fastening means such as a screw or other mechanism. The top plate 38 and inner body 12 may be made from a hard plastic resin such as Lexan® by way of example only. The use of a hard plastic resin contributes to impact resistant nature of the impact resistant speed sensing object 10.

Figure 4:
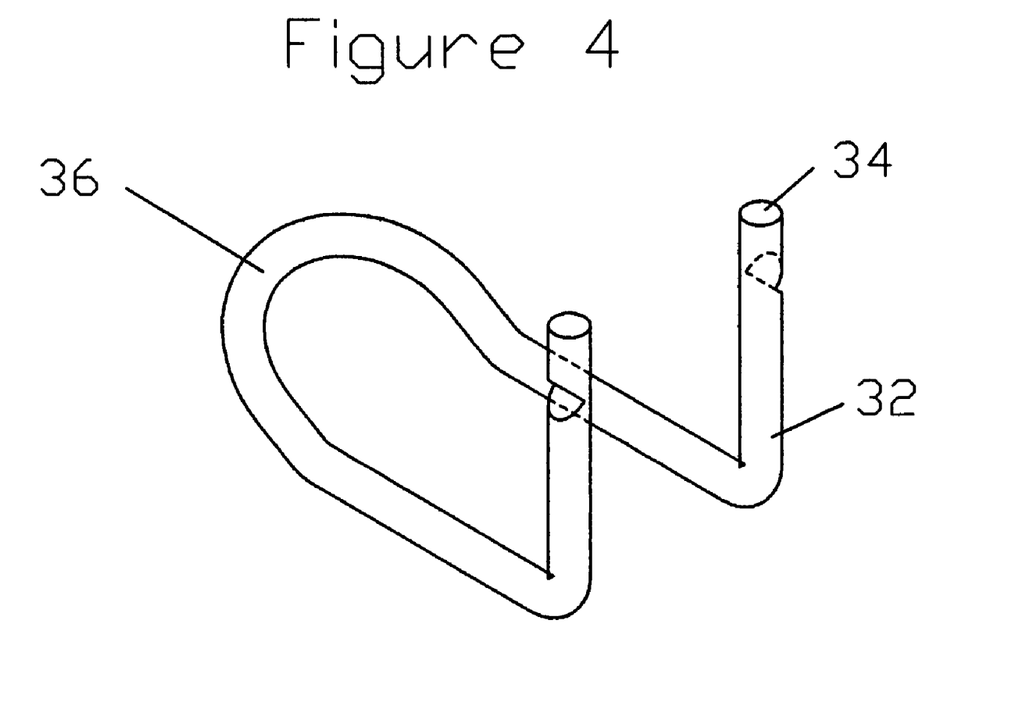
FIG. 4 in a perspective view, illustrates a support arm for insertion into the inner body of the impact resistant speed sensing object of FIG. 1.

Referring to FIG. 4 the inner body 12 may further comprise at least one supporting arm 32 that has a first end 34 adapted to engage the inner body 12 and a second end 36 adapted to engage the speed detecting sensor 16. Preferably there are two supporting arms 32 where the first ends 34 are each inserted into apertures in the inner body 12 and secured to inner body 12 using an adhesive. The speed detecting sensors 16 are mounted to the second ends 36 of the supporting arms 32. Preferably there are two speed detecting sensors 16 each is welded to each of the supporting arms 32.

Referring to FIG. 1 a transparent protection housing 42 adapted to encase the top surface 40 of the inner body 12, as well as a majority of the inner body 12 is slid over the inner body 12. In general approximately eighty percent of the inner body 12 is covered by the transparent protection housing 42. The transparent protection housing 42 may be further defined as a poly carbonate lens, made from a mixture of Lexan® and Siloxane by way of example only. The transparent protection housing 42 is secured to the inner body 12 by an adhesive. The securement of the transparent protection housing to the inner body 12 contributes to the impact resistant nature of the impact resistant speed sensing object 10.

A protective barrier 44 adapted to engage the bottom surface 30 of the inner body 12 may be applied to provide a protective, watertight seal and to ensure that the components remain in position. Preferably the protective barrier 44 may be layer of urethane by way of example only. The use of urethane provides a strong, durable, but not brittle barrier and remains pliable at low temperatures. Therefore during use of the impact resistant speed sensing object 10 in cold temperatures such as in a hockey environment, the protective barrier 44 does not crack or break.

Figure 6:
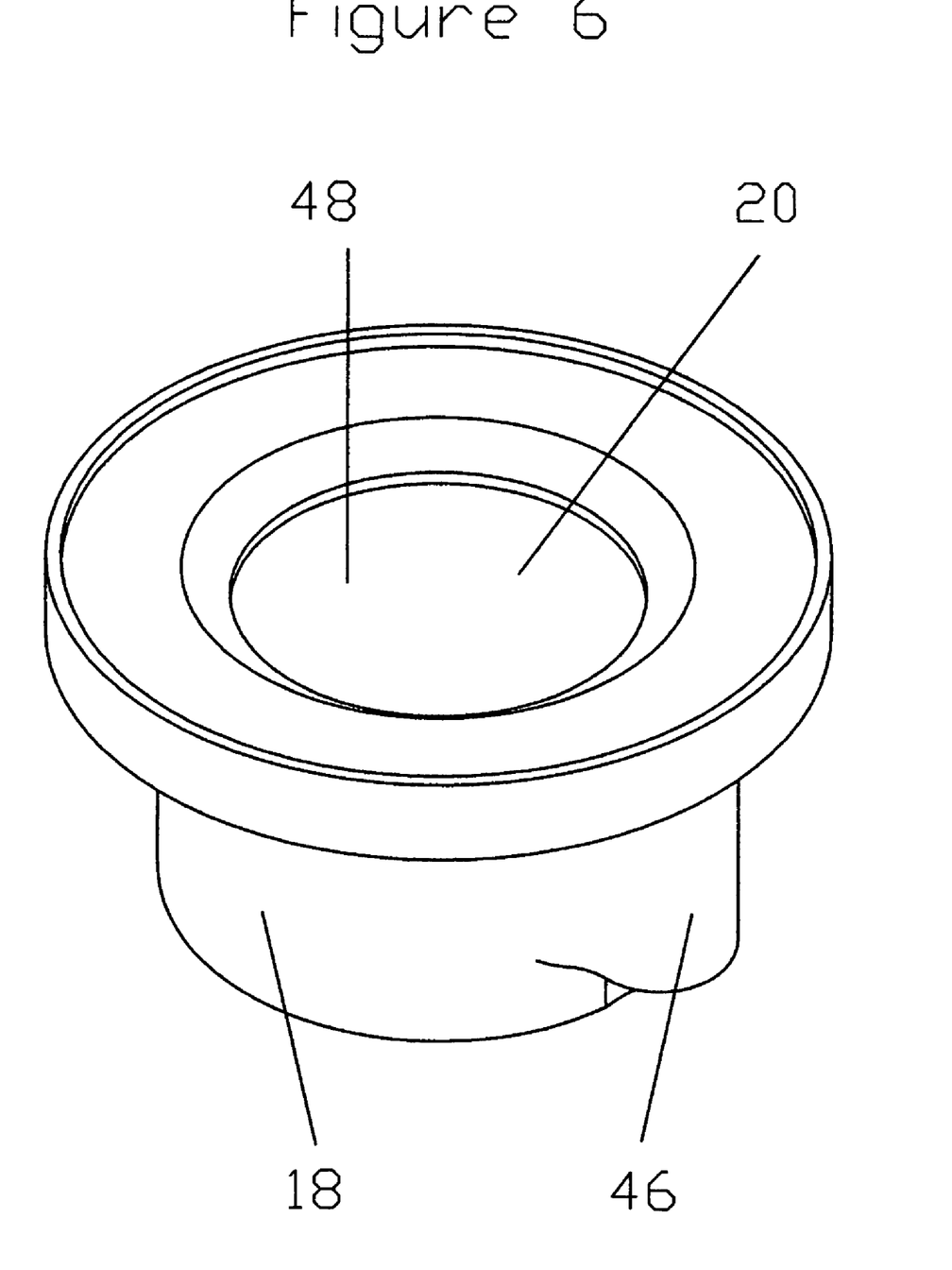
FIG. 6 in a top perspective view, illustrates the impact resistant housing of the impact resistant speed sensing object of FIG. 1.
Figure 7:
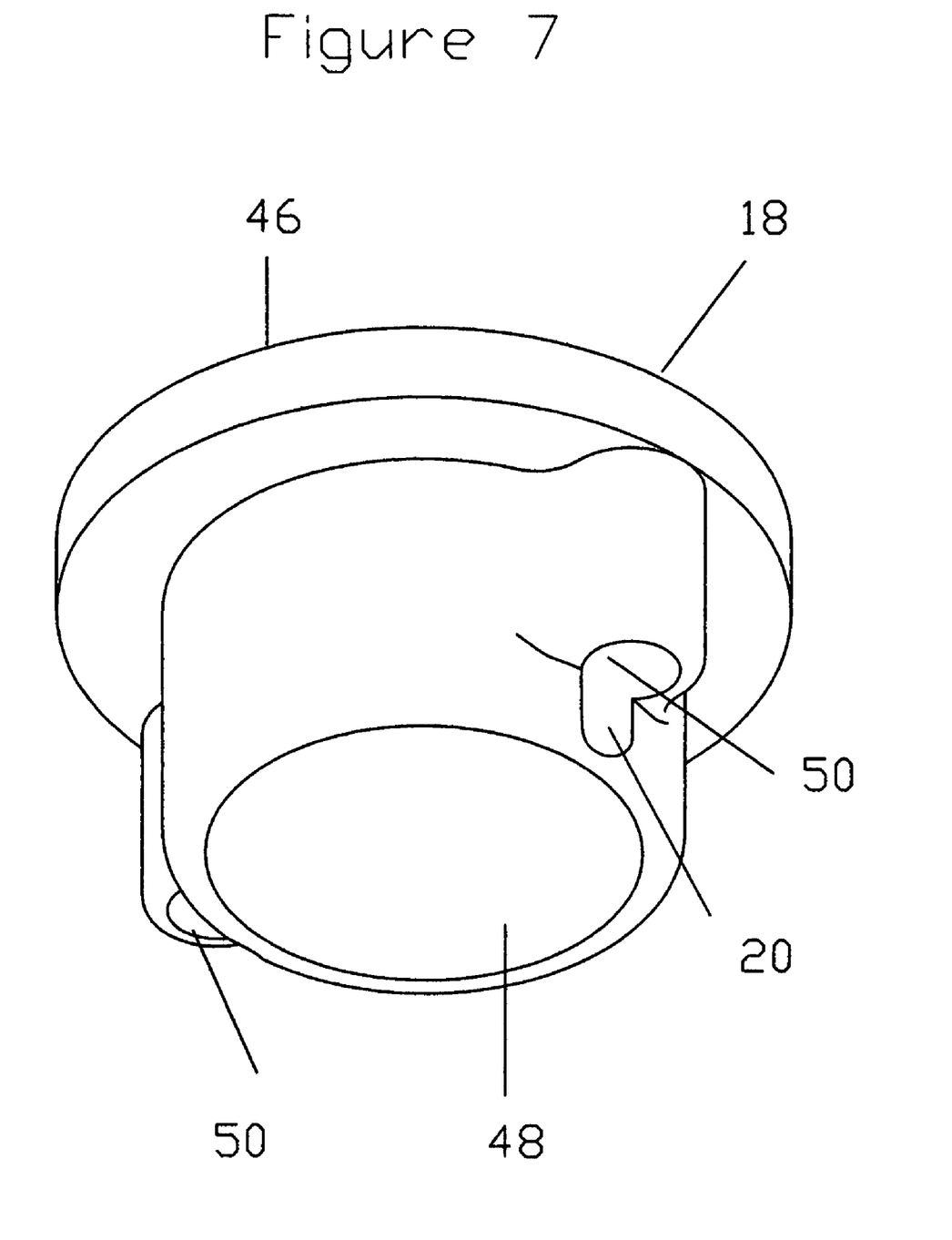
FIG. 7 in a bottom perspective view, illustrates the impact resistant housing of the impact resistant speed sensing object of FIG. 1.
Figure 8:
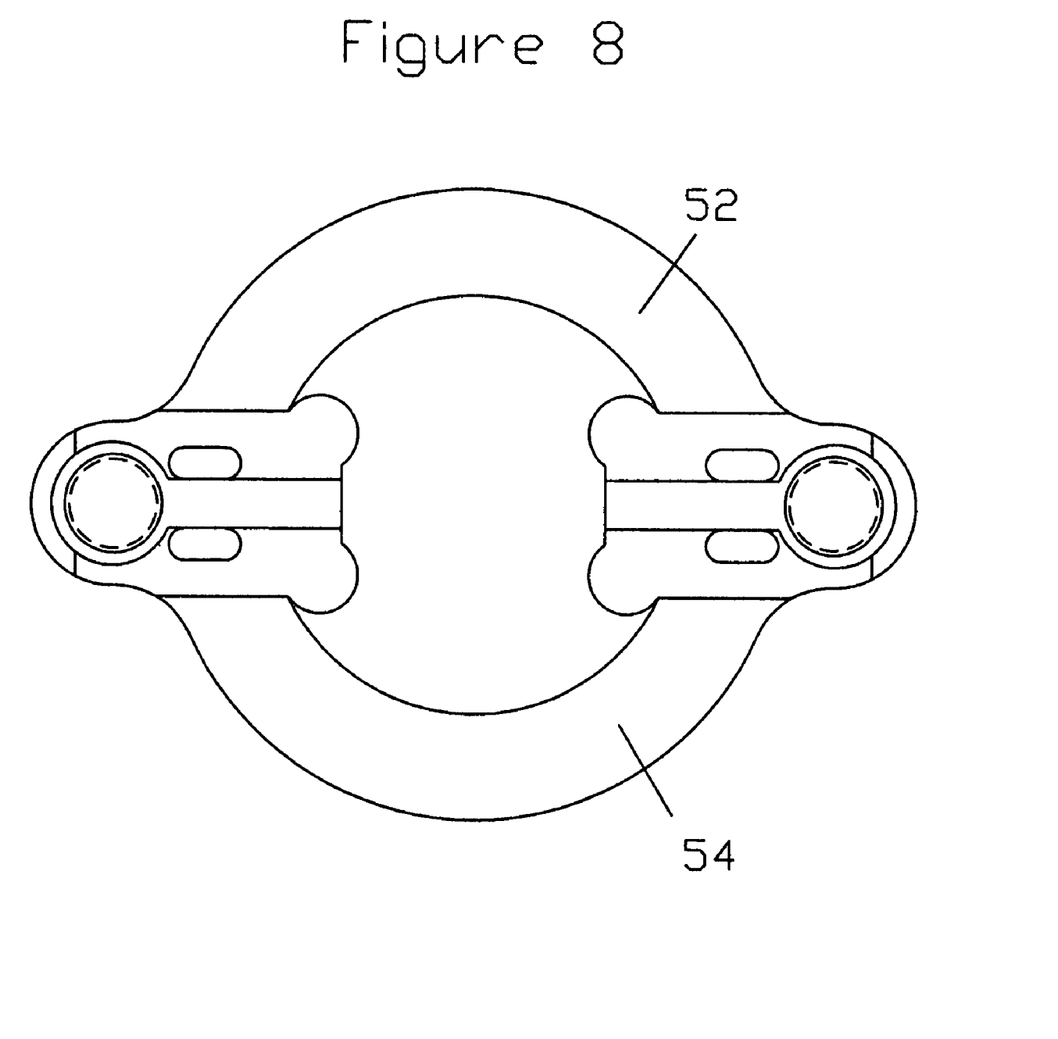
FIG. 8 in a top plan view, illustrates the bottom plate of the impact resistant housing of the impact resistant speed sensing object of FIG. 1.

Referring to FIGS. 6, 7, and 8 the impact resistant housing 18 may be defined as having a first portion 46 having a first aperture 48 adapted to receive inner body 12, and two apertures 50 each adapted receive the speed detecting sensors 16, and a second portion 52 adapted to engage the protective barrier 44. The first and second portions 46 and 52 respectively may be made from shock resistant natural rubber having a durometer or hardness of 40 Shore A by way of example only. The use of natural rubber contributes dramatically to the impact or shock resistance nature of the impact resistant speed sensing object 10. The impact resistant housing 18 may be created from an injection mold. The inner body 12 and the speed detecting sensors 16 are adhered into the impact resistant housing 18 using a shock absorbing adhesive.

The second portion 52 may be further defined as shock resistant bottom plate 54 that is secured to the first portion 46 and the inner body 12 and the speed detecting sensors 16 using a shock absorbing adhesive. The securement of the first and second portions 46 and 52 respectively, form a vapour proof and temperature insensitive impact resistant housing 18 making the display system 26 viewable in a wide variety of environments and temperatures without fogging.

Figure 9:
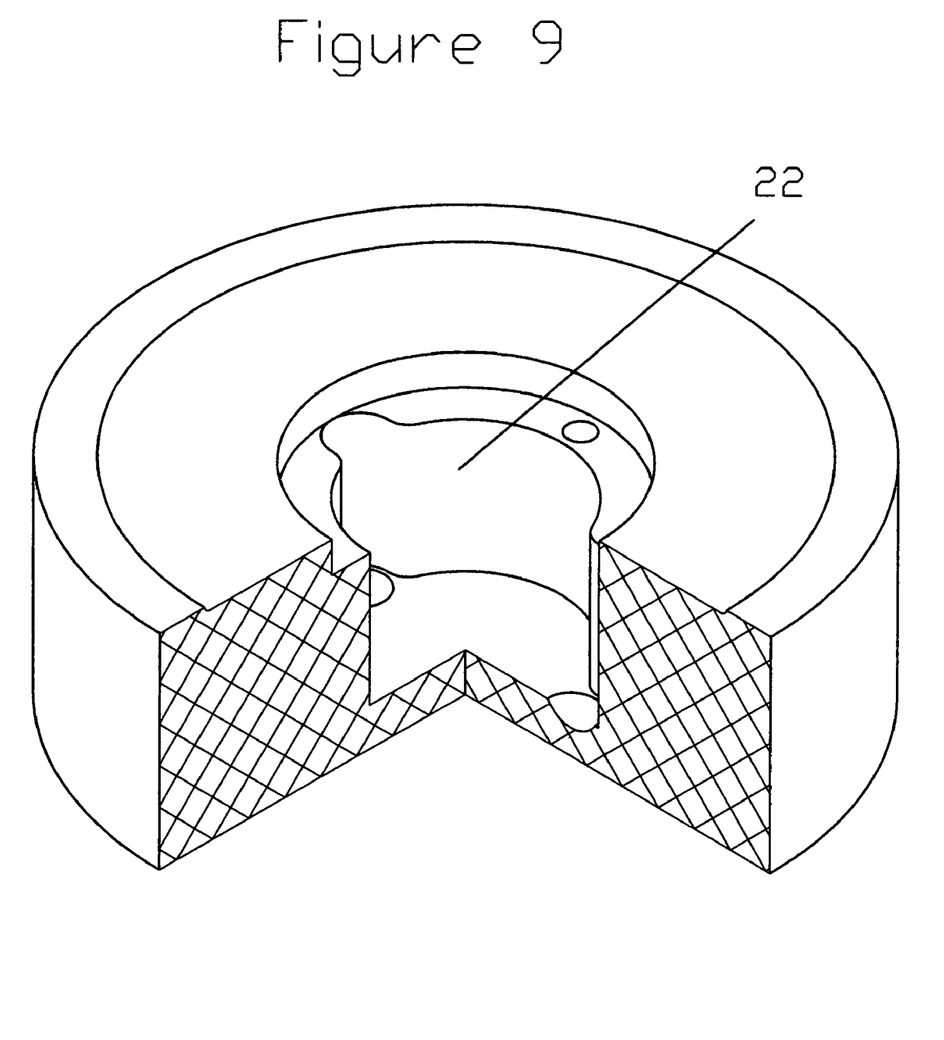
FIG. 9 in a cut-away perspective view, illustrates the aperture of the impact resistant speed sensing object of FIG. 1.

Referring to FIG. 9 the impact resistant housing 18 may then be adhered to the aperture 20 of the impact resistant speed sensing object 10 using a shock absorbing adhesive. The aperture 20 may have a ridged surface so as to facilitate the adhesion of the impact resistant housing 18 and that it is securely held within the impact resistant speed sensing object 10.

In operation the impact resistant speed sensing object 10 may be in the form of a hockey puck that can be set to measure the speed that the hockey puck travels over a variety of different distances. For accurately measuring the speed, the impact resistant speed sensing object 10 must travel the distance that it has been set for, and having the impact resistant speed sensing object 10 hit a hard object such as a wall or hockey board. Typically the impact resistant speed sensing object 10 is programmed for a variety of distances such as 16, 24, 36 and 48 feet.

The impact resistant speed sensing object 10 may have multiple shooting modes as determined by the impact resistant speed sensing object's 10 sensitivity. In a hockey puck format there may be three modes, snap, pass and slap. In the snap shot mode the hockey puck has the most sensitivity and therefore the user will not stick handle the puck and will just shoot the hockey puck. In the pass mode, the hockey puck will be in a less sensitive mode so the user can stick handle the puck prior to shooting the puck the predetermined distance. In the slap shot mode the user can shoot the predetermined distance after receiving a light pass. The speed detecting sensors 16 operate the three modes. Preferably the first speed detecting sensor 16 operated the slap shot mode and the second speed detecting sensor 16 controls the snap and pass modes. The hockey puck may also be programmed to have only the slap mode only, the slap and pass modes only, the slap and snap modes only or all three modes/

The ability to have multiple modes allows the impact resistant speed sensing object 10 to be used at the amateur level or for young players of the sport. For example in the snap mode a very light force will trigger the second speed detecting sensor 16, so very little strength is required by the player. In the pass mode the second speed detecting sensor 16 is also triggered to determine the speed, however additional processing is required through a digital signal so as to identify when the actual shot is taken versus the hockey puck being bumped or jarred. Once the correct acceleration curve is identified the speed can be determined. In this mode the impact resistant speed sensing object 10 can be passed around without triggering the second speed detecting sensor 16.

To initiate the slap mode the impact resistant speed sensing object 10 must be specifically turned on. The following describes how the user can change between the various modes. In use the impact resistant speed sensing object 10 or hockey puck will turn off if it not touched for one minute. Once the hockey puck is in the off mode, one can change settings. If the hockey puck is on the user must wait for one minute till it turns off. In the off mode, the user may bang the hockey puck hard on its side three times in quick succession. The display system 26 or LCD screen on the hockey puck will have a message scroll across it from right to left. It will give one of the following readings: Slap 16, Slap 24, Slap 36, Slap 48, Pass 16, Pass 24, Pass 36, Pass 48, Snap 16, Snap 24, Snap 36, or Snap 48.

The user can change the reading or setting by tapping the puck once. The setting will then change in sequential order: tapping it the first time will change it from Snap 16 to Snap 24; tap it one more time it changes from Snap 24 to Snap 36, and so on; finally, when it says Slap 48, it will change back to Snap 16. When the user finds the desired setting, the user can wait approximately two seconds until the display shows "00". The hockey puck is now ready to use. When the puck is no longer in use, the hockey puck will turn off, and when turned on again the hockey puck will start with the same setting as when it was turned off. The user can determine what the current setting of the hockey puck is when the hockey puck is on by hitting the hockey puck on its side one time and waiting for two seconds till the LCD screen shows the current setting.

Other variations and modifications of the invention are possible. All such modifications or variations are believed to be within the sphere and scope of the invention as defined by the claims appended hereto.

I claim:

1. An impact resistant speed sensing object, comprising:
   (a) an inner body having a processor;
   (b) at least one speed detecting sensor adapted to engage the inner body and adapted to interact with the processor for determining the speed of the impact resistant speed sensing object;
   (c) a transparent protection housing adapted to encase a majority of the inner body; and
   (d) an impact resistant housing having apertures adapted to receive the transparent protection housing encasing the majority of the inner body and the speed detecting sensor; wherein the impact resistant speed sensing object has an aperture adapted to receive the impact resistant housing with the transparent protection housing encasing the majority of the inner body and the speed detecting sensor,
   wherein the processor is configured to determine the speed of the speed sensing object after determining (i) that the speed sensing object receives a predetermined impact force, and (ii) that the speed sensing object has actually traveled a predetermined distance.

2. An impact resistant speed sensing object as claimed in claim 1 wherein the inner body further comprises a battery and a display system for engagement with the processor.

3. An impact resistant speed sensing object as claimed in claim 2 wherein the battery is in constant engagement with a series of tabs mounted to the battery for continuous power.

4. An impact resistant speed sensing object as claimed in claim 3 wherein the battery is a silver oxide battery partially forming a bottom surface of the inner body.

5. An impact resistant speed sensing object as claimed in claim 1 wherein the inner body further comprises at least one supporting arm having a first end adapted to engage the inner body and a second end adapted to engage the speed detecting sensor.

6. An impact resistant speed sensing object as claimed in claim 5 wherein the inner body accommodates two supporting arms and two speed detecting sensors.

7. An impact resistant speed sensing object as claimed in claim 2 wherein the inner body further comprises a top plate adapted to engage the display system and form a top surface of the inner body.

8. An impact resistant speed sensing object as claimed in claim 7 wherein the transparent protection housing is adapted to encase the top surface and the majority of the inner body.

9. An impact resistant speed sensing object as claimed in claim 8 wherein the transparent protection housing is a lens housing adapted to fit over the top surface of the inner body and encompassing the majority of the inner body.

10. An impact resistant speed sensing object as claimed in claim 4 further comprising a protective barrier adapted to engage the bottom surface of the inner body.

11. An impact resistant speed sensing object as claimed in claim 10 wherein the impact resistant housing is further defined as a first portion having a first aperture adapted to receive the inner body, and two apertures each adapted to receive the speed detecting sensor, and a second portion adapted to engage the protective barrier.

12. An impact resistant speed sensing object as claimed in claim 11 wherein the first and second portions are made from shock resistant natural rubber.

13. An impact resistant speed sensing object as claimed in claim 12 wherein the shock resistant natural rubber has a 40 Shore A durometer.

14. An impact resistant speed sensing object as claimed in claim 11 wherein the second portion is further defined as shock resistant bottom plate.

15. An impact resistant speed sensing object as claimed in claim 1 wherein the inner body and the speed detecting sensor are adhered into the impact resistant housing using a shock absorbing adhesive.

16. An impact resistant speed sensing object as claimed in claim 11 wherein the first and second portions form a vapour proof and temperature insensitive impact resistant housing.

17. An impact resistant speed sensing object as claimed in claim 11 wherein the impact resistant housing is adhered to the aperture of the impact resistant speed sensing object using a shock absorbing adhesive, wherein the aperture has a ridged surface.

18. An impact resistant speed sensing object as claimed in claim 1 wherein the impact resistant speed sensing object has a slap mode, a snap mode and a pass mode, in which the pass mode is most sensitive to impact, and the slap mode is least sensitive to impact.

19. An impact resistant speed sensing object as claimed in claim 18 wherein a first speed detecting sensor monitors the slap mode.

20. An impact resistant speed sensing object as claimed in claim 19 wherein a second speed detecting sensor monitors the snap mode and the pass mode.

21. A speed sensing object, comprising:
    (a) at least one speed detecting sensor;
    (b) a processor configured to interact with the at least one speed detecting sensor and to determine the speed of the speed sensing object;
    (c) an impact resistant housing adapted to encase the at least one speed detecting sensor and the processor,
    wherein the processor is configured to determine the speed of the speed sensing object after determining (i) that the speed sensing object receives a predetermined impact force, and (ii) that the speed sensing object has actually traveled a predetermined distance.

22. The speed sensing object recited in claim 21, wherein the predetermined distance is selected by a user from the group consisting of 16, 24, 36 and 48 feet prior to speed sensing.

23. The speed sensing object recited in claim 21, wherein the impact resistant speed sensing object is configured to operate in a plurality of modes each having a different predetermined impact force sensitivity.

24. The speed sensing object recited in claim 23, wherein the plurality of modes include a slap mode, a snap mode and a pass mode.

25. The speed sensing object recited in claim 24, wherein a first speed detecting sensor monitors the slap mode.

26. The speed sensing object recited in claim 25, wherein a second speed detecting sensor monitors the snap mode and the pass mode, and the second speed detecting sensor is more sensitive to impact force than the first speed detecting sensor.

27. The speed sensing object recited in claim 22, wherein the processor is configured to discriminate between an actual shot of the speed sensing object and the speed sensing object being bumped or jarred.

28. The speed sensing object recited in claim 21, wherein the predetermined impact force is the speed sensing object hitting an object.

29. The speed sensing object recited in claim 28, wherein the object is a hockey stick, a wall or a hockey board.

30. The speed sensing object recited in claim 23, wherein the operation of the plurality of modes is changed by tapping the speed sensing object.

31. The speed sensing object recited in claim 21, wherein the processor is configured to turn off, if the impact resistant speed sensing object is not touched or moved for a predetermined period of time.

32. The speed sensing object recited in claim 21, wherein the speed sensing object is configured as a hockey puck.

* * * * *